(12) United States Patent
Han et al.

(10) Patent No.: US 7,174,885 B2
(45) Date of Patent: Feb. 13, 2007

(54) COOKING APPARATUS

(75) Inventors: Dae-Sung Han, Hwasung (KR); Chul Kim, Yongin (KR); Yong-Woon Han, Kunpo (KR); Seong-Deog Jang, Suwon (KR); Kyung-Hee Ham, Seoul (KR); Joo-Yeong Yeo, Hwasung (KR); Han-Seong Kang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/681,136

(22) Filed: Oct. 9, 2003

(65) Prior Publication Data

US 2004/0149277 A1 Aug. 5, 2004

(30) Foreign Application Priority Data

Feb. 6, 2003 (KR) ............... 10-2003-0007554

(51) Int. Cl.
*A47J 3/06* (2006.01)

(52) U.S. Cl. ............... 126/41 R; 126/39 B; 126/39 E

(58) Field of Classification Search ............ 126/39 R, 126/41 R, 25 R, 39 D, 39 K, 39 E, 152 R, 126/152 B
See application file for complete search history.

(56) References Cited

U.S. PATENT DOCUMENTS

| 849,360 A | * | 4/1907 | Baxter | 126/39 C |
| 2,631,523 A | * | 3/1953 | Olving | 99/326 |
| 2,996,597 A | * | 8/1961 | Persinger et al. | 219/474 |
| 2,997,941 A | * | 8/1961 | Phelan et al. | 99/332 |
| 3,152,242 A |   | 10/1964 | De Mott | |

(Continued)

FOREIGN PATENT DOCUMENTS

FR 2 670 274 6/1992

(Continued)

OTHER PUBLICATIONS

Korean Patent Abstract for Publication No. 2002-16089, published Mar. 4, 2002.

(Continued)

*Primary Examiner*—Carl D. Price
(74) *Attorney, Agent, or Firm*—Staas & Halsey LLP

(57) ABSTRACT

A cooking apparatus capable of uniformly heating and cooking food laid on a grill unit using thermal energy radiated from a heating unit, includes a cabinet opened at a top surface thereof to provide an opening over which the food to be cooked is laid. A grill unit is seated in the opening of the cabinet so as to support the food over the opening. A heating unit is installed in the cabinet at a position offset from an effective grill part of the grill unit so that a front surface of the heating unit faces the grill unit to transmit thermal energy to the grill unit supporting the food laid thereon. The cooking apparatus also includes a heat blocking member to block a part of the thermal energy transmitted to an edge of the grill unit, thus allowing the thermal energy to be uniformly transmitted to the food laid on the grill unit. Thus, the cooking apparatus of the present invention allows food laid close to the edge and food laid on a central portion of the grill unit to be uniformly heated and cooked.

17 Claims, 3 Drawing Sheets

U.S. PATENT DOCUMENTS

| | | | | |
|---|---|---|---|---|
| 3,154,004 | A | * 10/1964 | Huck | 99/390 |
| 3,267,924 | A | * 8/1966 | Payne | 126/41 R |
| 3,371,659 | A | 3/1968 | Paspalas | |
| 3,413,912 | A | * 12/1968 | Phelan et al. | 99/400 |
| 3,527,199 | A | * 9/1970 | Harwood et al. | 126/39 J |
| 3,757,765 | A | * 9/1973 | Yamada | 126/41 R |
| 4,317,441 | A | * 3/1982 | Berg | 126/41 R |
| 4,508,024 | A | 4/1985 | Perkins | |
| 4,627,410 | A | * 12/1986 | Jung | 126/25 A |
| 4,865,864 | A | 9/1989 | Rijswijck | |
| 4,893,609 | A | 1/1990 | Giordani et al. | |
| 5,163,359 | A | * 11/1992 | McLane, Sr. | 99/447 |
| 5,189,945 | A | 3/1993 | Hennick | |
| 5,372,121 | A | 12/1994 | Castillo et al. | |
| 5,535,733 | A | 7/1996 | Hait | |
| 5,603,255 | A | * 2/1997 | Nouvelot et al. | 99/400 |
| 5,836,295 | A | * 11/1998 | Faraj | 126/25 R |
| 5,918,536 | A | * 7/1999 | Cheng | 99/447 |
| 6,125,838 | A | 10/2000 | Hedgpeth | |
| 6,293,276 | B1 | 9/2001 | Owens et al. | |
| 2001/0039884 | A1 | 11/2001 | Backus et al. | |

FOREIGN PATENT DOCUMENTS

| | | | |
|---|---|---|---|
| FR | 2 724 833 | | 3/1996 |
| GB | 2228565 | * | 8/1990 |
| GB | 2 286 111 | | 8/1995 |
| GB | 2286111 A | | 8/1995 |
| JP | 58-26913 | * | 2/1983 |
| JP | 59-138830 | * | 8/1984 |
| JP | 61-147024 | * | 7/1986 |
| JP | 62-91728 | * | 4/1987 |
| JP | 02-17330 | * | 1/1990 |
| JP | 02-178521 | * | 7/1990 |
| JP | 02-203105 | * | 8/1990 |
| JP | 03-20 | * | 1/1991 |
| JP | 04-307016 | * | 10/1992 |
| JP | 05-253076 | * | 10/1993 |
| JP | 06-154100 | * | 6/1994 |
| JP | 06-181849 | * | 7/1994 |
| JP | 08-210645 | * | 8/1996 |
| JP | 09-201292 | * | 8/1997 |
| JP | 10-169988 | * | 6/1998 |
| JP | 10-246409 | * | 9/1998 |
| JP | 11-201455 | * | 7/1999 |
| JP | 11-267032 | * | 10/1999 |
| JP | 11-299654 | * | 11/1999 |
| JP | 2000-135170 | * | 5/2000 |
| JP | 2000-245624 | * | 9/2000 |
| JP | 2000-254007 | * | 9/2000 |
| JP | 2000-254009 | * | 9/2000 |
| JP | 2001-169928 | * | 6/2001 |
| JP | 2001-349512 | * | 12/2001 |
| JP | 2002-177153 | * | 6/2002 |
| JP | 2002-355178 | * | 12/2002 |

OTHER PUBLICATIONS

Japanese Patent Abstract for Publication No. 11-267032, published May 10, 1999.
European Search Report from European Patent Office, dated Nov. 5, 2003.
Japanese Abstract 2001-120440 dated May 8, 2001.
Japanese Abstract 2000-254007 dated Sep. 19, 2000.
Japanese Abstract 2000-166771 dated Jun. 20, 2000.
Japanese Abstract 3-26216 dated Feb. 4, 1991.
U.S. Appl. No. 10/736,836, filed Dec. 17, 2003, Han et al.
U.S. Appl. No. 10/659,380, filed Sep. 11, 2003, Han et al.
U.S. Appl. No. 10/681,132, filed Oct. 9, 2003, Han et al.
U.S. Appl. No. 10/682,548, filed Oct. 10, 2003, Han et al.
U.S. Appl. No. 10/687,603, filed Oct. 20, 2003, Han et al.
U.S. Appl. No. 10/689,746, filed Oct. 22, 2003, Han et al.
U.S. Appl. No. 10/691,551, filed Oct. 24, 2003, Han et al.
U.S. Appl. No. 10/705,893, filed Nov. 13, 2003, Han et al.
U.S. Appl. No. 10/706,926, filed Nov. 14, 2003, Han et al.
U.S. Appl. No. 10/713,159, filed Nov. 17, 2003, Han et al.

* cited by examiner

COOKING APPARATUS

CROSS-REFERENCE TO RELATED APPLICATIONS

This application claims the priority of Korean Patent Application No. 2003-7554, filed Feb. 6, 2003 in the Korean Intellectual Property Office, the disclosure of which is incorporated herein by reference.

BACKGROUND OF THE INVENTION

1. Field of the Invention

The present invention relates, in general, to cooking apparatuses and, more particularly, to a cooking apparatus which is designed to uniformly heat and cook food laid on a grill unit.

2. Description of the Related Art

As is well known to those skilled in the art, cooking apparatuses are appliances which heat and cook food using heat generated by heating units.

Of these cooking apparatuses, there is a cooking apparatus which directly transmits heat to food, such as meat or sausage, to cook the food. The cooking apparatus includes a cabinet with a heating unit being provided in the cabinet to directly transmit heat to the food. A grill unit is mounted at an upper portion of the cabinet to support the food in such a way as to be spaced apart from the heating unit. When heat is generated by the heating unit, the food laid on the grill unit is cooked using the heat.

However, the conventional cooking apparatus has a problem in that the heating unit is installed in the cabinet at a position offset from an effective grill part (that is, a part of the grill unit on which the food is laid), so as to prevent the heating unit from being contaminated with a material dropping from the food laid on the grill unit such as oil. Consequently, a relatively large amount of thermal energy is supplied to an edge of the grill unit adjacent to the heating unit in comparison with a central portion of the grill unit, and thereby food laid close to the edge of the grill unit and food laid on the central portion of the grill unit are differently cooked.

SUMMARY OF THE INVENTION

Accordingly, it is an aspect of the present invention to provide a cooking apparatus, which is designed such that thermal energy radiated from a heating unit is uniformly transmitted to food.

Additional aspects and advantages of the invention will be set forth in part in the description which follows and, in part, will be obvious from the description, or may be learned by practice of the invention.

The foregoing and/or other aspects of the present invention are achieved by providing a cooking apparatus including a cabinet, a grill unit, a heating unit, and a heat blocking member. The cabinet is opened at a top surface thereof to form an opening over which food to be cooked is laid. The grill unit is seated in the opening of the cabinet so as to support the food over the opening. The heating unit is installed in the cabinet at a position offset from an effective grill part of the grill unit so that a front surface of the heating unit faces the grill unit to transmit thermal energy to the grill unit supporting the food laid thereon. The heat blocking member functions to block a part of the thermal energy transmitted to an edge of the grill unit, thus allowing the thermal energy to be uniformly transmitted to the food laid on the grill unit.

According to an aspect of the invention, the heating unit is provided at a rear portion thereof with a reflecting member to guide the thermal energy from the heating unit to the grill unit, and the heat blocking member integrally extends from the reflecting member to reflect the thermal energy transmitted from the heating unit.

According to an aspect of the invention, a reflecting plate is provided at a predetermined position below the grill unit to reflect the thermal energy of the heating unit to the grill unit, so that the thermal energy reflected by the heat blocking member is guided to a central portion of the grill unit by the reflecting plate.

According to an aspect of the invention, the heat blocking member extends to a predetermined position below the effective grill part of the grill unit so as to reflect the part of the thermal energy transmitted to the edge of the grill unit.

According to an aspect of the invention, a cover member extends from an edge of the opening to cover an upper surface of the heat blocking member.

According to another aspect of the invention, the cover member is downwardly inclined so that a material dropping from the food laid on the grill unit is guided into the opening.

According to an aspect of the invention, a tray provided with a reflecting plate is set at a predetermined position below the opening to collect a material dropping from the food laid on the grill unit, and an end of the cover member is positioned in a space above the tray so as to guide the material dropping from the food to the tray.

According to an aspect of the invention, the cover member is spaced apart from the heat blocking member by a predetermined gap to provide an air layer between the cover member and the heat blocking member.

BRIEF DESCRIPTION OF THE DRAWINGS

The above and/or other aspects and advantages of the invention will become apparent and more readily appreciated from the following description of the preferred embodiment, taken in conjunction with the accompanying drawings of which.

DETAILED DESCRIPTION OF THE PREFERRED EMBODIMENTS

Figure 1:
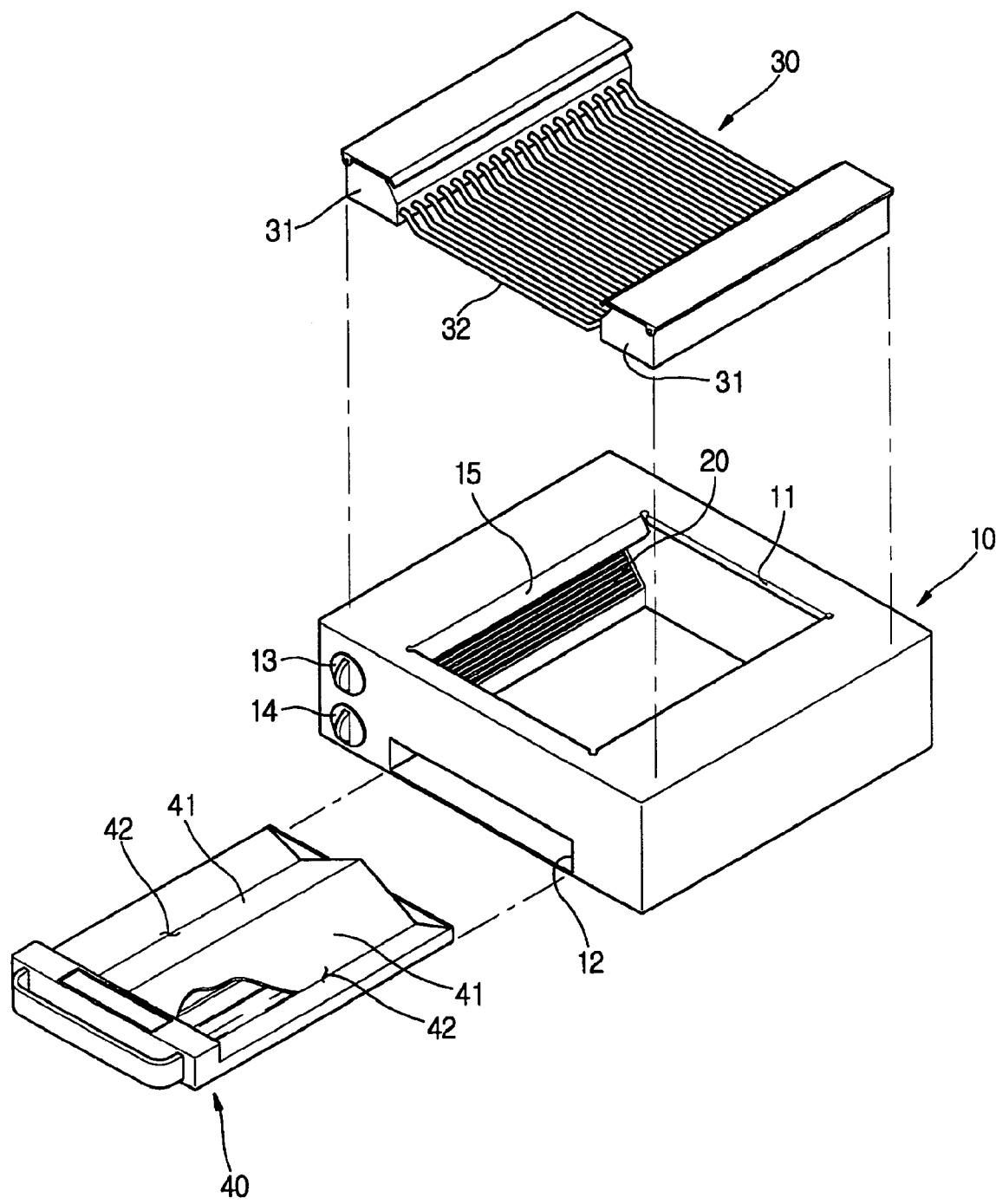
FIG. 1 is an exploded perspective view of a cooking apparatus, according to an embodiment of the present invention.

Reference will now be made in detail to the present preferred embodiment of the present invention, examples of which are illustrated in the accompanying drawings, wherein like reference numerals refer to like elements throughout.

Figure 2:
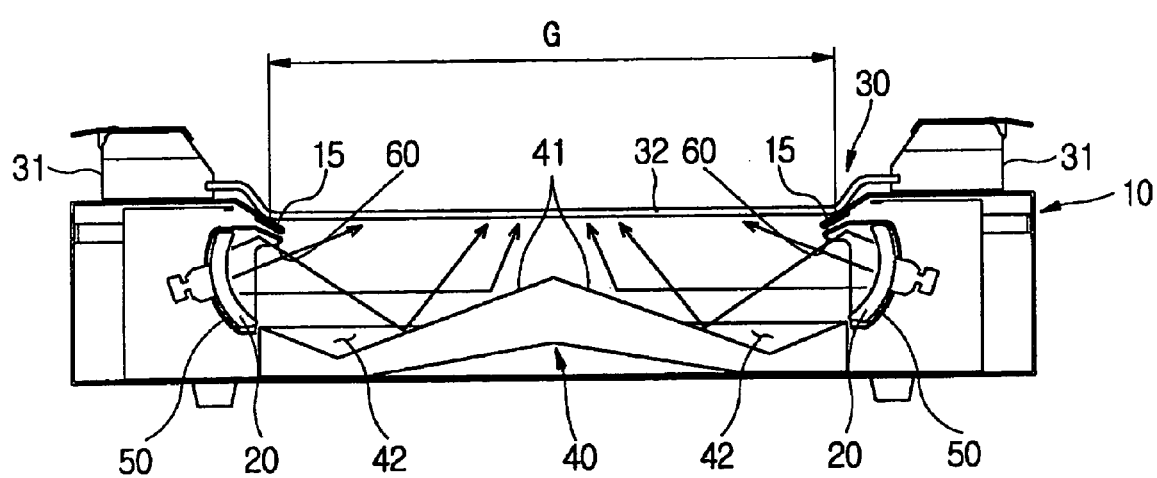
FIG. 2 is a sectional view of the cooking apparatus of FIG. 1.

As illustrated in FIGS. 1 and 2, a cooking apparatus according to the present invention includes a box-shaped cabinet 10. A plurality of heating units 20 are installed in the cabinet 10 to transmit heat to food to be cooked. A grill unit 30 on which the food is laid is seated on a top surface of the cabinet 10. The cooking apparatus also has a tray 40. The tray 40 collects a material dropping from the food laid on the grill unit 30, such as oil, and guides thermal energy from the heating units 20 to the grill unit 30.

The cabinet 10 is opened at a top surface thereof to provide an opening 11 and the grill unit 30 is seated in the opening 11, so that heat generated by the heating units 20 is transmitted to the grill unit 30. The cabinet 10 is opened at a front surface thereof so that the tray 40 is removably moved in and out the cabinet 10 through the opening, to be received in a cavity 12 provided in an interior of the cabinet 10. A timer switch 13 to control operation time of the heating units 20, and a power switch 14 to control heating temperature are provided at a surface of the cabinet 10.

The heating units 20 each include a ceramic member with a heating element to generate thermal energy such as heat and far infrared rays. The heating units 20 are set in both sides of the cavity 12 in such a way that front surfaces of the heating units 20 are opposite to each other. Further, the heating units 20 are inclinedly arranged to tilt toward the opening 11 to transmit thermal energy to the grill unit 30 which is seated in the opening 11.

The grill unit 30 includes two water tanks 31, and a plurality of grill pipes 32. The water tanks 31 are seated on both sides of the top surface of the cabinet 10, and contain water therein. The grill pipes 32 are arranged between the two water tanks 31 to connect the two water tanks 31 to each other, and have hollow structures so that water flows therein. Thus, the grill pipes 32 are continuously cooled by water supplied by the water tanks 31, thus preventing food in contact with the grill pipes 32 from being burnt.

The tray 40 is provided with a hump along a central axis thereof, and provided with reflecting plates 41 at both sides of the hump, thus reflecting the heat or far infrared rays from the heating units 20 to the grill unit 30. An oil collecting groove 42 is provided along a lowermost edge of each reflecting plate 41 to collect oil dropping from the food which is laid on the grill unit 30. Further, although not shown in the drawings, a predetermined amount of water is contained in the tray 40 so as to prevent an excessive rise in the temperature of the oil collecting grooves 42 and the reflecting plates 41, thus preventing the oil collected in the oil collecting grooves 42 from being burnt and adhered to the tray 40.

Further, the cooking apparatus includes a reflecting member 50 to guide the thermal energy such as the heat and far infrared rays, from a rear surface of each heating unit 20 to the opening 11 over which food to be cooked is laid. The reflecting member 50 surrounds upper, lower, and rear portions of each heating unit 20.

Figure 3:
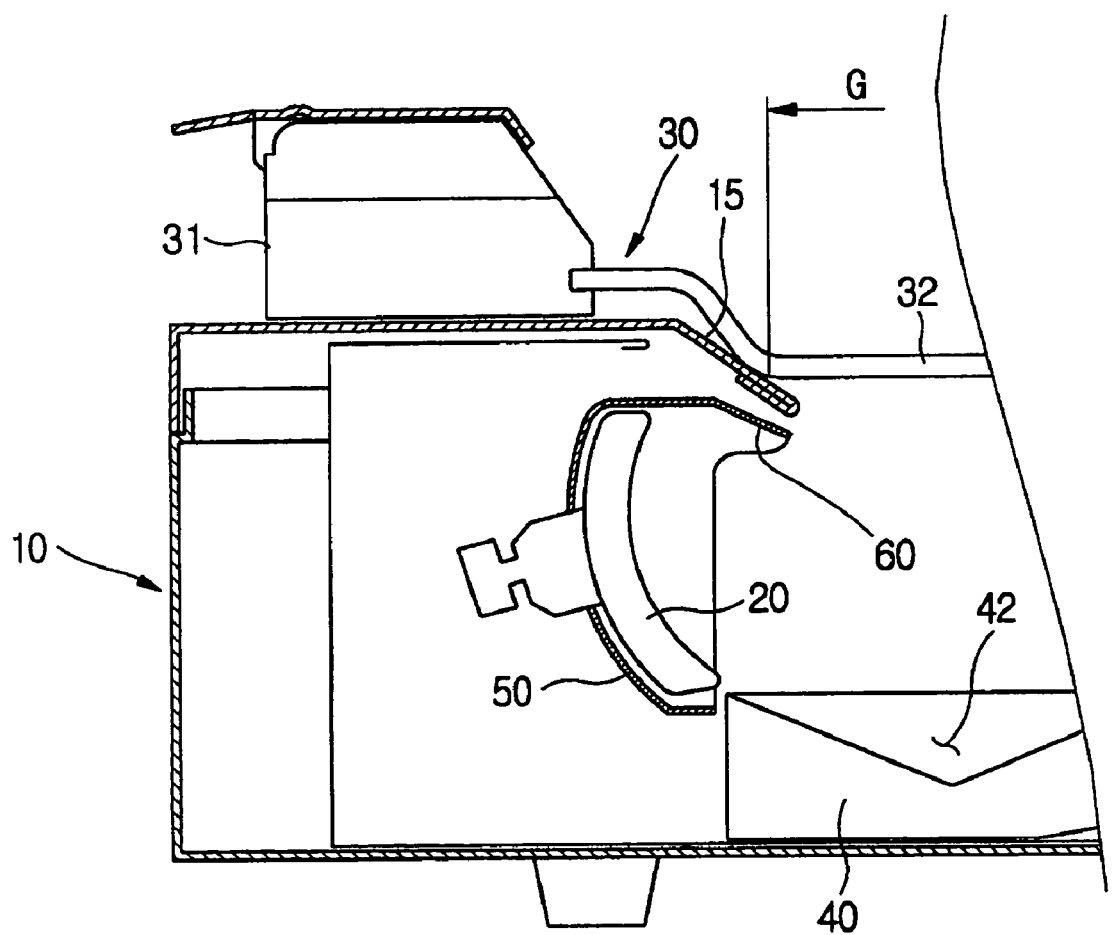
FIG. 3 is an enlarged view of a part of the cooking apparatus of FIG. 2.

As illustrated in FIG. 3, a heat blocking member 60 is provided at a position adjacent to each heating unit 20 to block a part of the thermal energy transmitted to an edge of the grill unit 30 adjacent to the heating unit 20.

The heat blocking member 60 extends to a predetermined position below an effective grill part G (that is, a part of the grill unit 30 on which food to be cooked is laid), so as to block a part of the thermal energy transmitted to the edge of the grill unit 30, thus allowing food laid on the edge of the grill unit 30 adjacent to each heating unit 20 and food laid on a central portion of the grill unit 30 which is distant from each heating unit 20 to be uniformly heated and cooked.

According to the embodiment of the present invention, the heat blocking member 60 integrally extends from the reflecting member 50 to reflect the thermal energy like the reflecting member 50. That is, the heat blocking member 60 reflects the part of the thermal energy which is transmitted to the edge of the grill unit 30, thus guiding the thermal energy to the central portion of the grill unit 30 through the reflecting plate 41 which is provided at a position below the heat blocking member 60.

Further, the cooking apparatus according to the present invention includes a cover member 15 so as to prevent a material produced from the food laid on the grill pipes 32, such as oil, from dropping to the heat blocking member 60 which extends to the predetermined position below the effective grill part G. The cover member 15 integrally extends from an edge of the opening 11 which is provided on the top surface of the cabinet 10 to cover an upper surface of the heat blocking member 60.

Thus, although the material drops from the food laid on the grill unit 30, the upper surface of the heat blocking member 60 is covered with the cover member 15, thus preventing the material produced from the food from dropping to the heat blocking member 60.

In this case, the cover member 15 is downwardly inclined so that the material dropping from the food is guided into the opening 11 due to gravity. Further, an end of the cover member 15 is positioned in a space above the tray 40 so that the material guided along the cover member 15 drops to and is collected in the tray 40. Further, the cover member 15 is spaced apart from the heat blocking member 60 by a predetermined gap to form an air layer between the cover member 15 and the heat blocking member 60, thus preventing heat from being transmitted from the heating unit 20 to the cover member 15.

An operation and operational effect of the cooking apparatus according to the present invention will be described below.

When power is applied to the cooking apparatus after laying food on the grill unit 30, heat and far infrared rays are generated from the heating units 20 provided at both sides of the cabinet 10 so as to heat and cook the food.

Of the far infrared rays radiated from each heating unit 20, a part of the rays radiated to the edge of the grill unit 30 are reflected by the heat blocking member 60 which extends to the predetermined position below the effective grill part G, thus being guided to the central portion of the grill unit 30 through the reflecting plate 41. Thermal energy transmitted to the food laid close to the edge of the grill unit 30 is reduced while thermal energy transmitted to the food laid on the central portion of the grill unit 30 is increased, thus allowing the food laid close to the edge and the food laid on the central portion of the grill unit 30 to be uniformly heated and cooked.

While the food is cooked, the material produced from the food, such as oil, drops down through gaps among the grill pipes 32. Since the upper surface of the heat blocking member 60 is covered with the cover member 15, the heat blocking member 60 is not contaminated due to the material dropping from the food.

Further, since the cover member 15 is downwardly inclined, the material dropping from the food is guided along the cover member 15 to the tray 40 which is provided at a predetermined position below the opening 11, and is collected in the oil collecting groove 42.

As is apparent from the above description, the present invention provides a cooking apparatus, which is provided with a heat blocking member to block a part of thermal energy transmitted to an edge of a grill unit, thus allowing food laid close to the edge and food laid on a central portion of the grill unit to be uniformly cooked.

Although an embodiment of the present invention has been shown and described, it would be appreciated by those skilled in the art that changes may be made in the embodiment without departing from the principles and spirit of the invention, the scope of which is defined in the claims and their equivalents.

What is claimed is:

1. A cooking apparatus, comprising:
   a cabinet opened at a top surface thereof to provide an opening over which food to be cooked is laid;
   a grill unit seated in the opening of the cabinet so as to support the food over the opening;
   a heating unit installed in the cabinet at a position offset from an effective grill part of the grill unit so that a front surface of the heating unit faces the grill unit to transmit thermal energy to the grill unit supporting the food laid thereon;
   a heat blocking member integrally extending from a reflecting member of the heating unit, to extend below a predetermined portion of the grill unit to reflect and block a part of the thermal energy transmitted to an edge of the grill unit, allowing the thermal energy to be uniformly transmitted to the food laid on the grill unit; and
   a cover member extending from an edge of the opening to cover an upper surface of the heat blocking member and downwardly inclined so that a material dropping from the food laid on the grill unit is guided into the opening.

2. The cooking apparatus according to claim 1, wherein the reflecting member is provided at a rear portion of the heating unit to guide the thermal energy from the heating unit to the grill unit.

3. The cooking apparatus according to claim 2, further comprising:
   a reflecting plate provided at a predetermined position below the grill unit to reflect the thermal energy of the heating unit to the grill unit, so that the thermal energy reflected by the heat blocking member is guided to a central portion of the grill unit by the reflecting plate.

4. The cooking apparatus according to claim 3, further comprising:
   a tray provided with a reflecting plate set at a predetermined position below the opening to collect a material dropping from the food laid on the grill unit, and
   an end of the cover member is positioned in a space above the tray so as to guide the material dropping from the food to the tray.

5. The cooking apparatus according to claim 3, wherein the cover member is spaced apart from the heat blocking member by a predetermined gap to provide an air layer between the cover member and the heat blocking member.

6. A cooking apparatus, comprising:
   a cabinet to provide an opening over which food to be cooked is laid;
   a tray to removably move in and out of the cabinet through the opening and to be received in a cavity provided in an interior of the cabinet;
   a grill unit seated in the opening of the cabinet to support the food over the opening;
   a plurality of heating units installed in the cabinet at positions offset from an effective grill part of the grill unit so that the heating units face the grill unit to transmit thermal energy to the grill unit supporting the food laid thereon;
   heat blocking members integrally extending from a reflecting member of the heating units, to extend below a predetermined portion of the grill unit to reflect and to block a part of the thermal energy transmitted to an edge of the grill unit, allowing the thermal energy to be uniformly transmitted to the food laid on the grill unit; and
   a cover member extending from an edge of the opening to cover an upper surface of the heat blocking members and downwardly inclined so that a material dropping from the food laid on the grill unit is guided into the opening.

7. The cooking apparatus according to claim 6, wherein each of the heating units includes a ceramic member with a heating element to generate the thermal energy.

8. The cooking apparatus according to claim 6, wherein the heating units are set at opposite sides of the cavity, respectively, so that the front surfaces of the heating units are opposite to each other.

9. The cooking apparatus according to claim 6, wherein the heating units are inclinedly arranged to tilt toward the opening to transmit the thermal energy to the grill unit.

10. The cooking apparatus according to claim 6, wherein the grill unit comprises:
    a plurality of water tanks respectively seated on both sides of the cabinet to contain water; and
    a plurality of grill pipes arranged between the water tanks to connect the water tanks to each other, and having hollow structures so that the water is supplied thereto from the water tanks and flows therein.

11. The cooking apparatus according to claim 10, wherein the grill pipes are continuously cooled by the water supplied by the water tanks, preventing the food supported by the grill pipes from being burnt.

12. The cooking apparatus according to claim 11, wherein the tray comprises:
    a hump along a central axis thereof; and
    reflecting plates respectively provided at both sides of the hump, to reflect the thermal energy from the heating units to the grill unit.

13. The cooking apparatus according to claim 12, wherein the reflecting plates are respectively provided at predetermined positions below the grill unit to reflect the thermal energy of the heating unit to the grill unit, so that the thermal energy reflected by the heat blocking members is guided to a central portion of the grill unit by the reflecting plates.

14. The cooking apparatus according to 12, further comprising:
    an oil collecting grooves provided along an edge of the reflecting plates to collect oil dropping from the food which is laid on the grill unit.

15. The cooking apparatus according to claim 14, wherein a predetermined amount of water is contained in the tray to prevent an excessive rise in temperature of the oil collecting groove and the reflecting plates, preventing the oil collected in the oil collecting groove from being burnt and adhered to the tray.

16. The cooking apparatus according to claim 6, further comprising:
    a timer switch to control an operation time of the heating units; and
    a power switch to control a heating temperature of the heating units.

17. The cooking apparatus according to claim 10, wherein at least one side of the heat blocking members extends in a direction beyond a point where the grill pipes bend to block the part of the thermal energy transmitted to the edge of the grill unit.

* * * * *